Patented Aug. 19, 1930

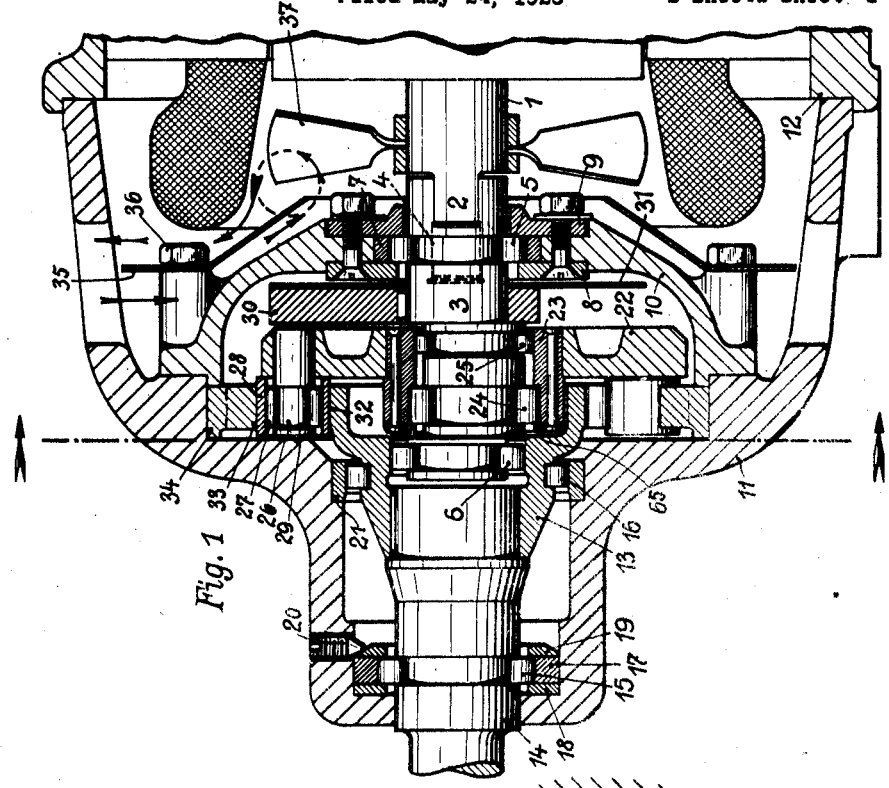
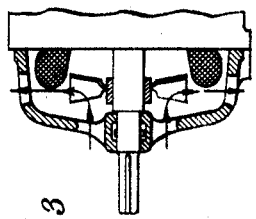
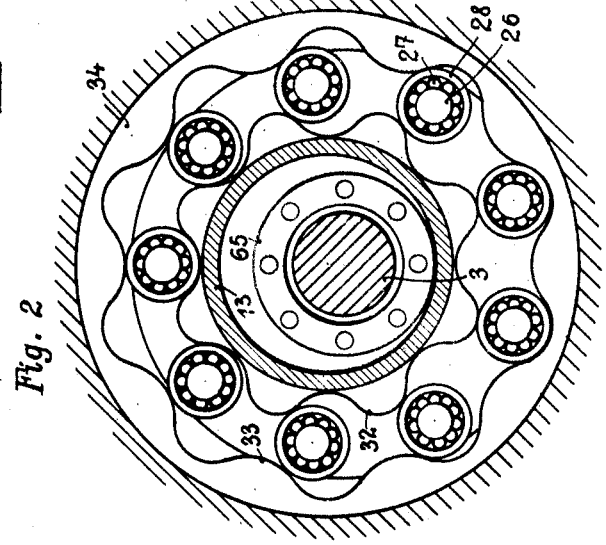

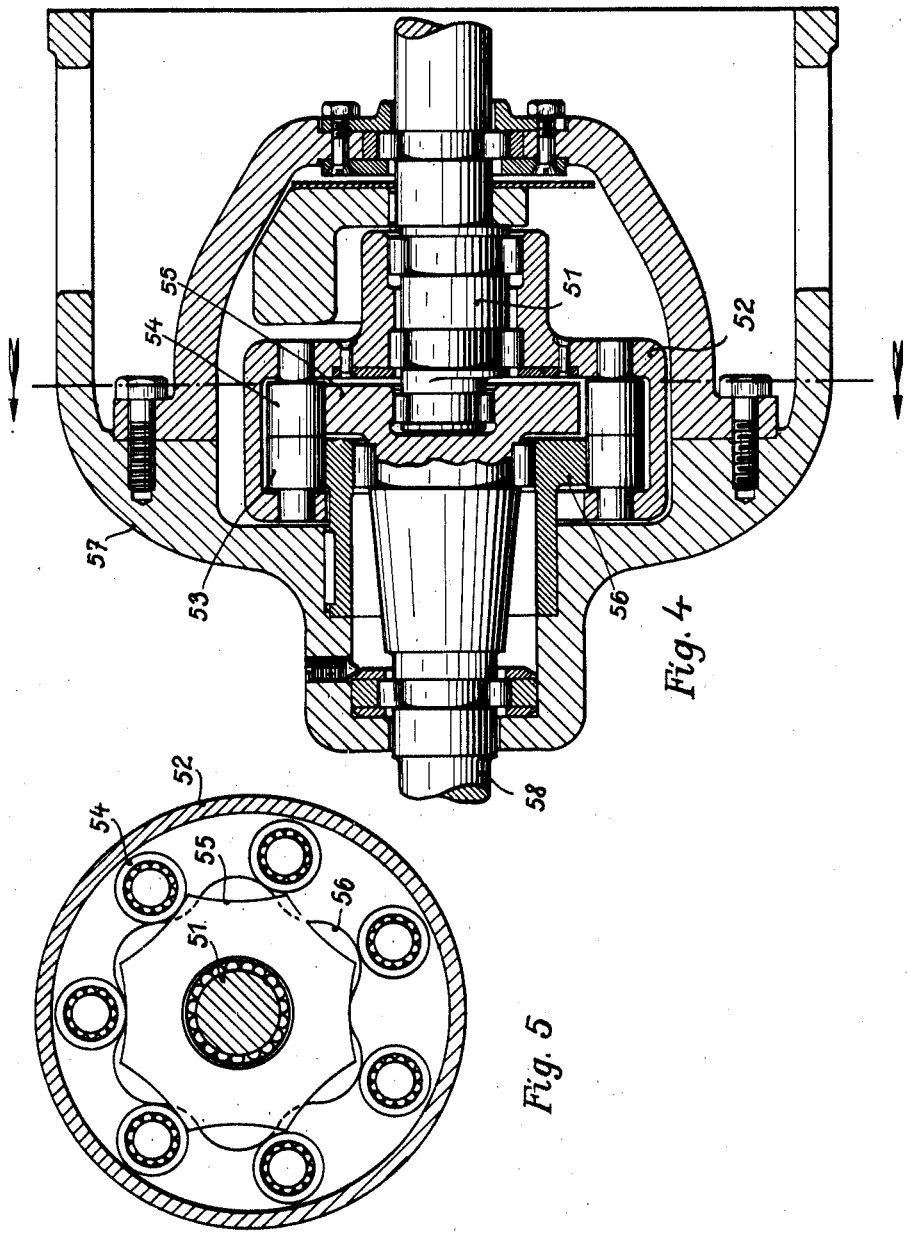

1,773,568

UNITED STATES PATENT OFFICE

LORENZ KONRAD BRAREN, OF MUNICH, GERMANY, ASSIGNOR TO THE FIRM FRIEDRICH DECKEL, PRÄZISIONSMECHANIK UND MASCHINENBAU, OF MUNICH, BAVARIA, GERMANY

GEAR TRANSMISSION

Application filed May 24, 1928, Serial No. 280,264, and in Germany June 13, 1927.

The invention relates to gear transmissions and has for its object to provide a transmission with a fixed speed ratio of a very simple, compact and durable form. This object is attained by arranging an intermediate disc in engagement with the fast and slowly rotating members. This disc is mounted eccentrically on the fast member and carries a set of members engaging with teeth of two discs of which one is fastened to or forming part of the slow shaft while the other one is held stationary. The teeth on both these discs form equidistants to continuous cycloidal curves. Of the curves on these two discs one is an epicycloid or epitrochoid while the other is an hypocycloid or hypotrochoid. I preferably use a prolate epi- and hypotrochoid.

Another object of my invention is to secure axially both the fast and the slowly rotating shafts independently of each other and to provide sufficient axial play for the engaging means.

I furthermore according to my invention construct the transmission with roller bearings of special construction.

Another important object of my invention is to provide guiding means for the cooling air of an electric motor where the usual course of circulation is obstructed by a transmission gear built into the end shield of the motor.

The above and various other improvements will be hereinafter fully described and claimed. In order that this my invention may be more readily understood reference is made to the accompanying sheets of drawings which show how the invention may be carried into practical effect.

Fig. 1 is a longitudinal section of a gear transmission built into the end shield of an electromotor.

Fig 2 is a cross section of the transmission shown in Figure 1.

Fig. 3 shows the circulation of air in an electromotor without axial restriction.

Fig. 4 shows a modified arrangement of the curves in Figure 1.

Fig. 5 shows the shape of the curves in Figure 4.

Referring to the Figures 1 and 2 the fast rotating shaft 1 in the present instance the armature shaft of an electric motor fits with a flat key like portion 2 into a slot of the crank shaft 3. A circular turned down part 4 on shaft 1 extends beyond the key like portion 2 and fits into a bore of the shaft 3. The shaft 3 is journaled in two roller bearings 5 and 6 the shaft itself forming the races and guideways for the rollers. The outer race 7 of the bearing 5 is held by two hardened plates 8 and 9 to the cover 10 of the transmission housing 11 which latter at the same time serves as end shield for the electromotor 12. The rollers of the bearing 6 run in the bore of a part 13, pressed onto a shaft 14 both parts 13 and 14 together forming the slowly rotating member. The division is only made for convenience of manufacture. This member is journaled in roller bearings 15 and 16. Here again the rollers are running in grooves provided on the shafts 13, 14. The outer race 17 for the bearing 15 is located between two side plates 18 and 19 in a recess of the body 11 and held there by a number of conical set screws 20 pressing the complete bearing against a shoulder of the housing 11 while the race 21 for the bearing 16 is pressed into a recess of the body 11. Thus the fast and slowly rotating shafts are held axially independently of each other.

An intermediate disc 22 is mounted with its separate hardened hub 23 on two roller bearings 24 and 25 eccentric on the shaft 3. A groove in the shaft guides sideways the rollers of the bearing 24. A plate 65 riveted to the hub 23 together with a shoulder in the bore of this hub hold axially the intermediate disc. On the intermediate disc 22 there are mounted evenly spaced a number of engaging members each consisting of a pin 26 pressed into the body of the intermediate disc with a recess for receiving a number of rollers 27 and a bushing. 28. The bore of this bushing forms the outer race for the roller bearing. The bushing 28 is not restrained axially by the rollers 27 but is held in place by a face 29 of the transmission housing 11. A counterweight 30 keyed to the shaft 3 balances the intermediate disc 22 moving eccentrically. In order to prevent lubricant being forced in excess into and through the bearing 5 by the counterweight 30 a circular plate 31 has been fastened to the counterweight.

The members on the intermediate disc 22 engage on the inside with teeth 32 formed on a portion of the slowly rotating member 13 and on the outside with teeth 33 on a disc 34 clamped between the cover 10 and the transmission body 11. Both sets of teeth form a continuous cycloidal curve one, preferably the external curve on the member 13, an epicycloid or epitrochoid with the number of teeth 32 one smaller than the number of engaging members on the intermediate disc and the other, the internal curve on the disc 34, an hypocycloid or hypotrochoid with the number of teeth 33 one larger than the number of engaging members. With the curves as indicated and the outer member stationary the sense of rotation of the two shafts 3 and 13, 14 in relation to each other is opposite and the ratio of reduction is one half the number of teeth 32 to one. But with the shaft 13, 14 held stationary and the housing 11 free to rotate the sense of rotation of the shaft 3 and the housing 11 will be identical and the ratio of reduction one half the number of teeth 33 to one. In order to obtain a smooth shape the prolate type of curve with the generating point located inside of the rolling circle is preferably chosen. The curves actually used of course must be equidistants which are determined by the radius of the engaging members.

The circulation of air for cooling an electro-motor becomes quite difficult when restricting the free axial inflow as is the case with the gear transmission built directly into the end shield. The usual flow of air is indicated on Figure 3. In order to overcome these difficulties a guide 35 for instance a thin shield of conical shape is held by the screws 36 fastening the cover 10 to the transmission body 11. This guide extends close to the ventilating fan 37 of the motor 12 and prevents the forming of an air current resembling in shape a circular ring as indicated by the dotted lines on Figure 1, which is more or less the case with axial restriction. The fan may be located further back entirely within the windings without impairing the efficiency of the circulation of air. Such a shield of course may also be used to advantage with an ordinary electric motor, having a large bearing or carrying a closed pulley right up against the end shield.

A modified arrangement of the curves is shown on the Figures 4 and 5. On the fast shaft 51 there is mounted to rotate eccentrically an intermediate disc 52 carrying a set of evenly spaced rollers 53 and 54 two on each pin engaging with two curves 55 and 56 of which the latter is fastened to the transmission housing 57 while the former is part of the slowly rotating shaft 58. One of the curves is a continuous epicycloid or -trochoid with a number of teeth one less than the number of engaging members, while the other is a continuous hypocycloid or -trochoid with a number of teeth or more than the number of engaging members. The ratio of speed is one half the number of teeth on the movable curve. Similarly the two curves may be arranged both outside of the engaging members.

Having now particularly described and ascertained the nature of this my invention and in what manner the same is to be performed, I do not wish to be understood as limiting myself to the exact details of construction as obviously many modifications will occur to a person skilled in the art.

What I claim is:

1. In a gear transmission a fast rotating member, a slowly rotating member, an intermediate disc mounted to turn eccentrically on said fast member, a set of rollers mounted evenly spaced on said intermediate disc and two members with tooth like projections both in engagement with said engaging rollers, one of said toothed members fastened to said slowly rotating member and the other of said toothed members held against rotary movement, the teeth on one of said toothed members forming part of a continuous prolate epitrochoid with the number of teeth one less than the number of engaging members, the teeth on the other of said toothed members forming part of a continuous prolate hypotrochoid with the number of teeth one more than the number of engaging members.

2. In gear transmission a fast rotating member, a slowly rotating member, an intermediate disc mounted to turn eccentrically on said fast member, a set of engaging members mounted evenly spaced on said intermediate disc, a member with tooth like projections engaging said engaging members on the outside, said member being held against rotary movement, the teeth on said member forming part of a continuous prolate hypotrochoid, with the number of teeth one more than the number of engaging members and another member also with tooth like projections engaging said engaging members on the inside, said second member being fastened to said slowly rotating member, the teeth on said second member forming part of a continuous prolate epitrochoid with the number of teeth one less than the number of the engaging members.

3. In a gear transmission a housing consisting of two parts joined in an axial direction, a fast rotating shaft, a slowly rotating shaft, an eccentric portion on said fast rotating shaft, an intermediate disc mounted rotatably on said fast rotating shaft, means for transmitting the movement from said intermediate disc to said slowly rotating shaft said transmitting means consisting in part of a series of evenly spaced pins and rollers, antifriction rollers to support said slowly rotating shaft radially and axially in one of the parts of said housing, other antifriction rollers for supporting said fast rotating shaft radially and axially in the other part of said housing, a different set of antifriction rollers for supporting said fast shaft only radially in said slowly rotating shaft, another series of antifriction rollers for supporting said intermediate disc both axially and radially on said fast shaft and further antifriction rollers for supporting said rollers axially on said pins.

4. In a gear transmission a housing consisting of two parts joined in an axial direction, a fast rotating shaft, a slowly rotating shaft, an eccentric portion on said fast rotating shaft, an intermediate disc mounted rotatably on said fast rotating shaft, means for transmitting the movement from said intermediate disc to said slowly rotating shaft said transmitting means consisting in part of a series of evenly spaced pins and rollers, antifriction rollers to support said slowly rotating shaft radially and axially in one of the parts of said housing, other antifriction rollers for supporting said fast rotating shaft radially and axially in the other part of said housing, a different set of antifriction rollers for supporting said fast shaft only radially in said slowly rotating shaft, another series of antifriction rollers for supporting said intermediate disc both axially and radially on said fast shaft and further antifriction rollers for supporting said rollers axially on said pins, all said antifriction rollers running in grooves provided directly in said different shafts and pins.

5. In a gear transmission, a fast rotating member having an eccentric portion thereon, a slowly rotating member, a disc rotatably mounted on said eccentric portion of said fast rotating member, engaging rollers mounted on said disc, and two members with tooth like projections in engagement with said engaging rollers, one of said toothed members being fastened to said slowly rotating member and the other of said toothed members being held against rotary movement, the teeth on both of said toothed members forming substantially an equidistant of a continuous prolate trochoid.

6. In a gear transmission, a fast rotating member having an eccentric portion thereon, a slowly rotating member, a disc rotatably mounted on said eccentric portion of said fast rotating member, engaging rollers mounted on said disc, and two members with tooth like projections in engagement with said engaging rollers, one of said toothed members being fastened to said slowly rotating member and the other of said toothed members being held against rotary movement, the teeth on one of said toothed members forming substantially an equidistant of a continuous prolate epitrochoid, and the teeth on the other of said toothed members forming substantially an equidistant of a continuous prolate hypotrochoid.

7. In a gear transmission, the combination with a fast rotating member having an eccentric portion thereon, of a slowly rotating member, a transmission member mounted on said eccentric portion of said fast rotating member and rotatable bodily in response to rotation of said fast rotating member, means for causing an angular rotation of said transmission member in response to the bodily rotation thereof, means for rotating said slowly rotating member in accordance with movements of said transmission member, a bearing for said fast rotating member, a counterweight mounted on said fast rotating member for balancing parts moving eccentrically, said counterweight tending to splash lubricant into said bearing, and shield means between said counterweight and said bearing for reducing the splashing of lubricant into said bearing.

In testimony whereof I hereunto affix my signature.

LORENZ KONRAD BRAREN.